Nov. 21, 1939. H. FELDMEIER Re. 21,270

HEAT EXCHANGE DEVICE

Original Filed Oct. 14, 1929 3 Sheets-Sheet 1

INVENTOR.

BY Harvey Feldmeier

Norman E. H. Pelletier

ATTORNEY.

Nov. 21, 1939. H. FELDMEIER Re. 21,270

HEAT EXCHANGE DEVICE

Original Filed Oct. 14, 1929 3 Sheets-Sheet 2

INVENTOR.

BY Harvey Feldmeier

Norman C. H. Heltzke

ATTORNEY.

Nov. 21, 1939. H. FELDMEIER Re. 21,270

HEAT EXCHANGE DEVICE

Original Filed Oct. 14, 1929 3 Sheets-Sheet 3

INVENTOR.

BY Harvey Feldmeier

Norman E. H. Pletzke

ATTORNEY.

Reissued Nov. 21, 1939

Re. 21,270

UNITED STATES PATENT OFFICE 21,270

HEAT EXCHANGE DEVICE

Harvey Feldmeier, deceased, late of Little Falls, N. Y., by Cherry-Burrell Corp., assignee, Little Falls, N. Y.

Original No. 1,840,573, dated January 12, 1932, Serial No. 399,462, October 14, 1929. Application for reissue June 5, 1939, Serial No. 277,488

31 Claims. (Cl. 257—184)

This invention relates to heat exchange devices, and particularly to the type which may be utilized for the cooling of liquids such as milk. When liquids such as milk are handled in such devices, it is necessary that the device be so constructed that all surfaces engaged by the liquid may be readily accessible for cleaning; that any treating medium leaking through the separable connections be prevented from mixing with and contaminating the milk being handled in the cooling device, and that the device be capable of rapid assembly or disassembly for cleaning purposes.

An object of this invention is to provide an improved heat exchange device which will handle a maximum quantity of liquid to be treated in a minimum of space occupied; with which possible contamination of the liquid being treated will be prevented; with which all the surfaces engaged by the liquid may be easily and quickly made accessible for cleaning; which may be made in various capacities largely from standardized parts or units; with which the liquid in its treatment may be subjected to heat exchange with different mediums or mediums at different temperatures; and which will be relatively simple, compact, efficient and inexpensive.

Various other objects and advantages will be apparent from the following description of an embodiment of the invention, and the novel features will be particularly pointed out hereinafter in connection with the appended claims.

Figure 1:
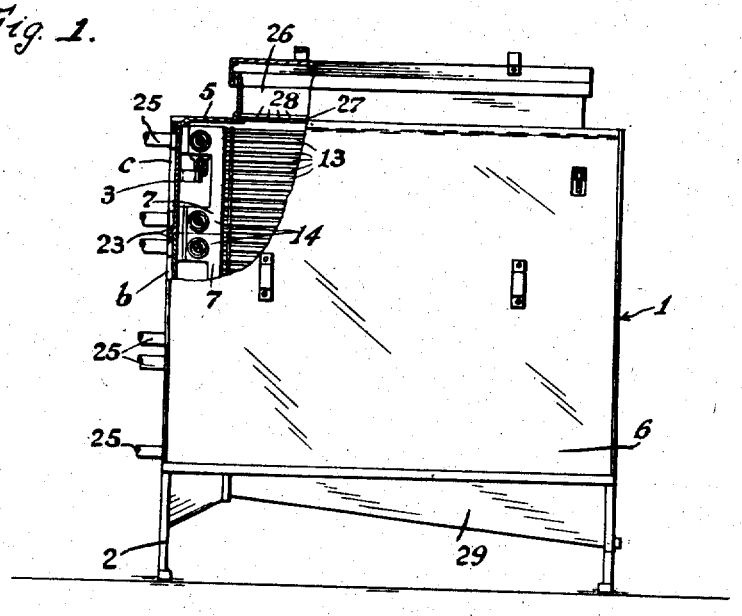
Fig. 1 is a side elevation, with parts broken away, of a cabinet type cooler for milk, constructed in accordance with this invention.

In the illustrated embodiment of the invention, a plurality of heat exchange units are arranged side by side in close relation to one another, and a heat exchange medium is circulated through these units. The liquid to be treated, such as milk, is flowed downwardly over the exposed surfaces of the units for the heat exchange. The units are relatively movable in a direction laterally of themselves into spaced relation to one another to provide spaces between adjacent units for cleaning purposes.

More particularly, the illustrated device is adapted for the cooling of milk, and includes a cabinet or casing 1 having a base 2 which serves as a frame for mounting the various parts of the assembly. The casing or cabinet 1 includes opposite end walls 3, each of which may be built up of a plurality of similar sections *a*, *b* and *c* suitably secured together and to the base 2 such as by bolts or screws 4. A top plate 5 is similarly attached to the upper ends of the side walls.

Figure 3:
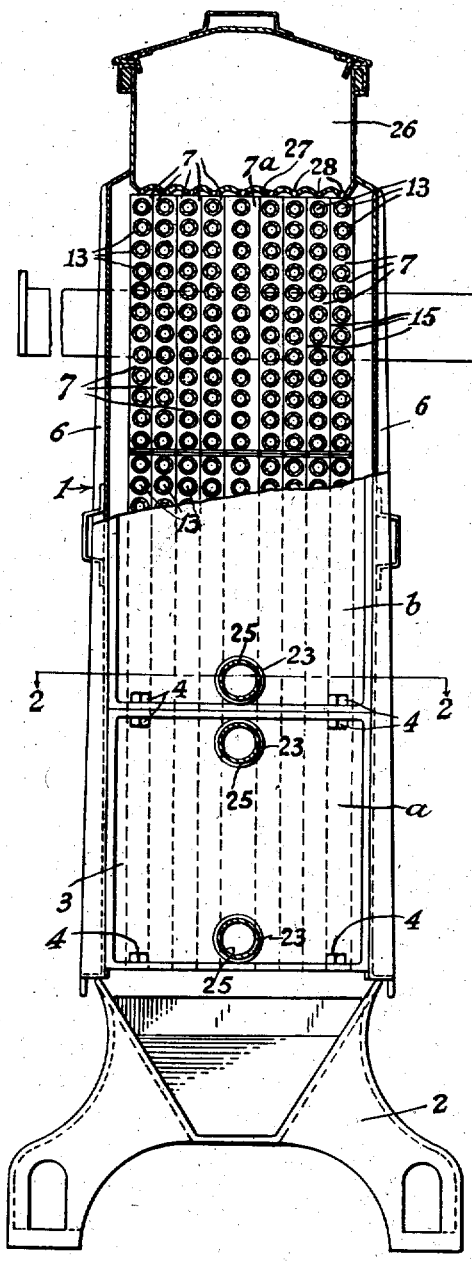
Fig. 3 is an end elevation of the same, partly in section.

The two opposite sides of the cabinet or casing are open, and provided with movable closures 6. These closures may be entirely removable or mounted for movement into a position in which they will not materially obstruct the open sides of the cabinet when access to the interior of the cabinet or casing is desired. The closures or side walls 6, however, are normally in closed position, as shown in Figs. 1 and 3 when the device is in use, so as to prevent the entrance of dust and the like into the cabinet where it would contaminate the liquid being treated.

A plurality of vertically extending heat exchange units 7 are arranged side by side and face to face to one another within the cabinet or casing 1 and across the open sides, so that the units may be inserted or removed laterally of themselves through the open sides after the closures 6 have been moved out of obstructing or closed positions. One unit or element of the device, such as an intermediate unit, may be relatively fixed in the casing to one of the end sections thereof, as will be observed from Fig. 2 and explained hereinafter. The other units are movable laterally of themselves and to the relatively fixed unit through the open sides into spaced relation to one another and to said fixed unit in order that access may be had to all parts and both faces of all of said units for cleaning purposes.

The cabinet or casing 1 is provided, adjacent its opposite ends, with rails or tracks 8 which extend outwardly through the open sides of the casing from each side face, and all of the movable units may be mounted on these tracks or rails 8 for support within the cabinet and while moving in and out of the cabinet for cleaning purposes. The covers 6 may be supported by rollers running on rails 8, so as to be easily moved into open or closed positions.

Figure 5:
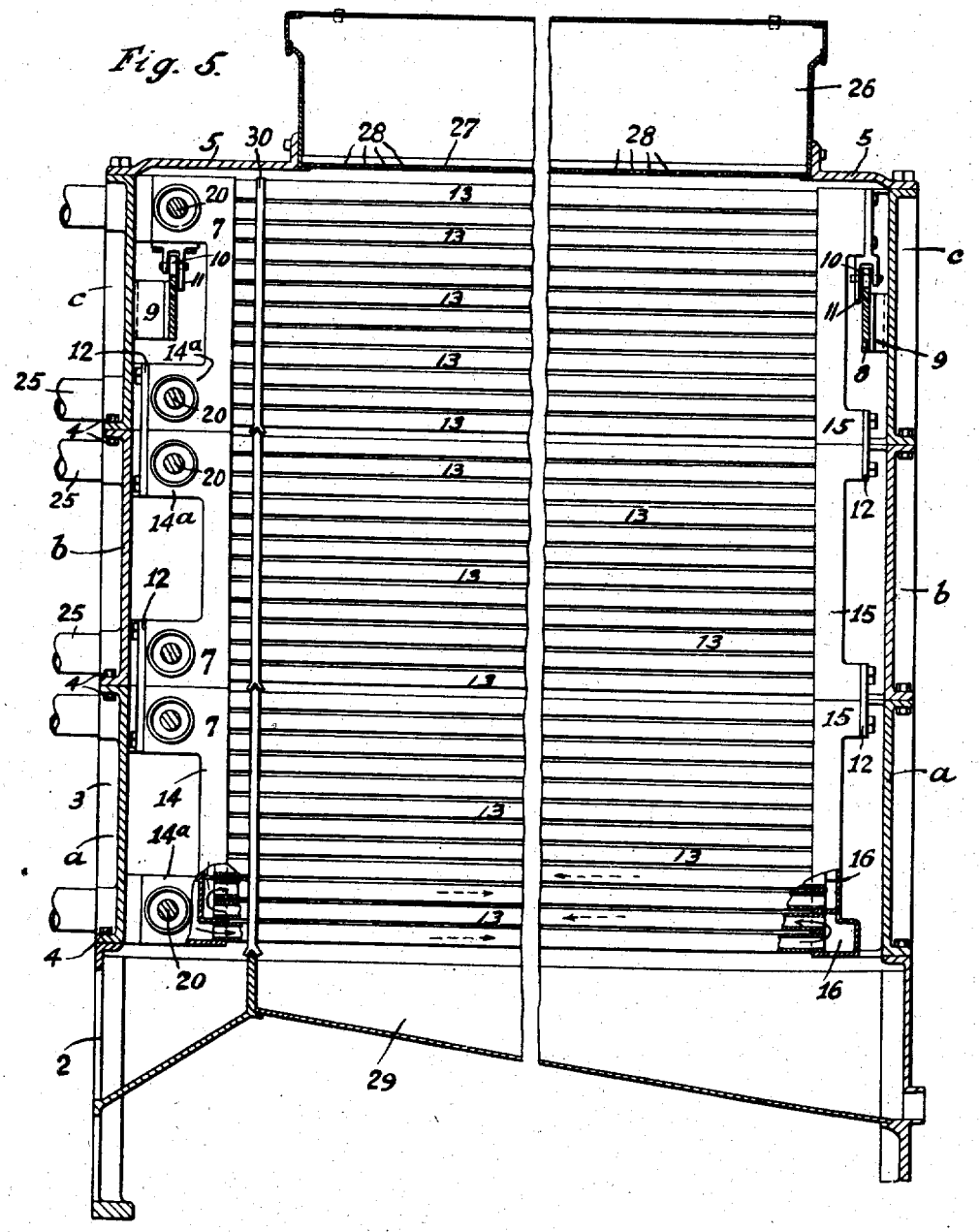
Fig. 5 is a longitudinal sectional elevation of the cooler.

The rails 8 may be attached to the inner faces of the upper end sections *c* of the end walls in any suitable manner such as by straps or lugs 9, and each movable unit may have rollers 10 running upon the upper edges of the rails or tracks, as shown clearly in Fig. 5. The units may have flanges 11 depending somewhat along the inner faces of the rails 8, as shown in Fig. 5, and confining the rollers 10 to the rails.

Figure 4:
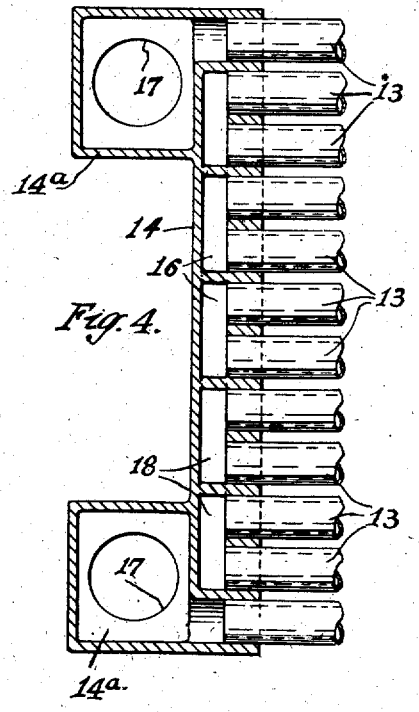
Fig. 4 is a sectional elevation of one end of the units.

Each unit may be formed of a plurality of superposed sections (Fig. 5) corresponding in vertical dimensions to the sections *a*, *b* and *c* of the end walls 3, and the various sections of each unit may be connected to one another in any suitable manner, such as by straps or bars 12 which provide flexible or hinge connections between the sections. Each section of a unit, a part of one of which is shown separately in Fig. 4, is provided with a plurality of superposed pipes 13. These pipes are spaced from one another vertically and connected to one another at their adjacent ends in any desired order by headers 14 and 15.

Each header serves as a frame for supporting and spacing the pipes 13, and providing a connection to the ends of the pipes which are supported and spaced thereby. Each header 14, for example, may have inlet and outlet chambers 14*a*, Fig. 4, which are in communication with the adjacent ends of the uppermost and lowermost pipes of that section. In addition, each header 14, is also provided with a plurality of separate chambers or passages 16 which connect adjacent ends of the pipes supported by that header in series with one another in pairs.

The headers 15 are similar except that they have only the chambers 16 which connect together in pairs the adjacent ends of the pipes supported thereby, the pairs being different from the pairs connected by the header 14, so that all of the pipes in each section will be connected in series to one another, with the free ends of the series connected to the chambers 14*a* of the headers 14. The connecting straps 12 may, for convenience, be attached to the headers, as shown in Fig. 5.

Figure 2:
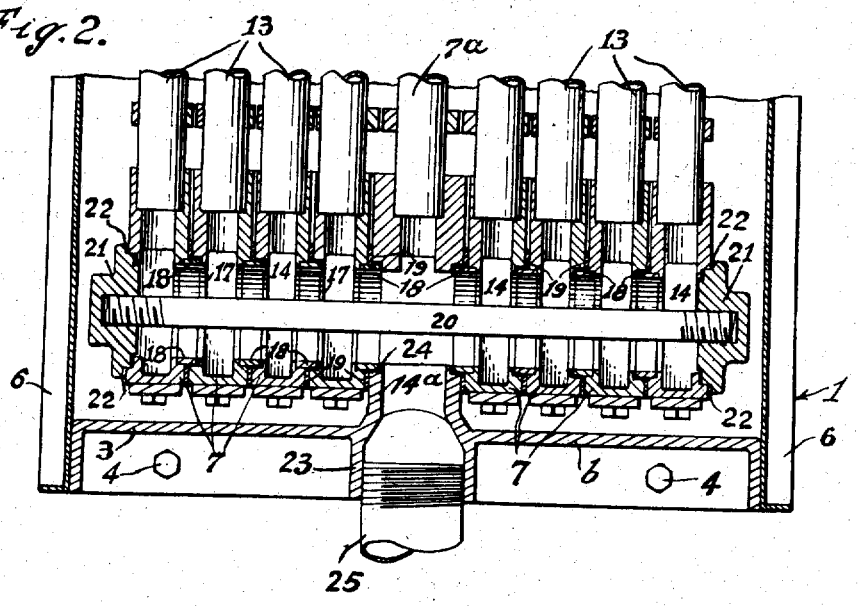
Fig. 2 is a sectional plan of a portion of the same, the section being taken approximately along the line 2—2 of Fig. 3.

The abutting faces of the adjacent headers 14 are provided with ports or apertures 17, Figs. 2 and 4, which are aligned with one another when the units are brought together face to face within the cabinet. The outer faces of the two outer units are provided with similar ports, so as to permit of standardization of the headers and units, and to permit of expansion of the capacity of the device by the addition of other units.

Bushings or rings 18 (Fig. 2) are interposed between the headers of adjacent units in alignment with the ports 17, the rings 18 being preferably countersunk within the ports, and also preferably secured to one of the abutting headers, such as by being tightly fitted or driven therein. The rings 18 thus form a telescopic connection between the headers, and suitable gasket rings 19, such as of paper, are prived around the periphery of the bushing rings 18, so as to effectively seal the connection between the abutting ports 17 of abutting units.

A clamping rod 20 extends through each group of the aligned ports 17 and bushing rings 18, as shown clearly in Fig. 2, and at its ends is threaded into closures or caps 21, which close the ports 17 in the outer faces of the outermost units. Suitable gasket rings 22 may be interposed between caps 21 and the outer faces of the headers against which the caps fit. By screwing the caps 21 upon the rod 20 to different extents, the headers may be drawn tightly together to seal the connections between them. The straps 12 connecting the sections of the units permit sufficient flexibility between the sections to insure that all of the points between its abutting ports 17 of the several units will be liquid tight when the units are clamped together.

It will be observed that through this manner of connecting the abutting headers, the corresponding sections of all the units will be connected together in parallel or multiple, so that if a circulating medium is supplied to the interior of any one of the headers, it will also be supplied to all of the other headers of the corresponding sections of the units.

Suitable provision is made for supplying a circulating medium, such as a cooling solution, to the sections of one of the units, preferably to the relatively fixed unit. Such connections may be made in any desired manner, but for convenience, the sections of one end wall 3 may have the headers for the fixed unit formed integral therewith, each end wall section at one end of the cabinet having two passages 23 which merge into the chambers 14*a* of the header 14 at that end of the cabinet, as shown in Fig 2.

A passage 23 is provided for each chamber 14*a* of each section of the unit to which the circulating connections are to be made, and the circulating connections are preferably made to sections of the same unit, which unit may be considered as the relatively stationary unit, with the other sections movable toward and from this fixed unit. Suitable pipes 25 are connected to the tubular projections having the passages 23, through which a heat exchange medium such as brine or water may be supplied to the units.

By providing separate circulating connections for each horizontal row of abutting sections, it is possible to supply a different heat exchange medium, or the same medium at different temperatures, to the different sections of the units and obtain a desired progressive control of the heat exchange with the liquid to be treated and which is flowed over the outsides of the pipes 13. If desired, the pipes 25 leading to the various unit sections may be connected in series or in any desired arrangement to one another.

A tank or container 26 is secured to the top wall 5 of the cabinet in any suitable manner, and opens downwardly through the top wall 5 above the units. The bottom wall 27 of the tank 26 is provided with rows of apertures 28 extending above the uppermost pipes 13 of each unit when the units are assembled side by side, so that when the liquid to be treated, such as milk, is placed in the tank 26, it will be discharged through the bottom wall of the tank in small streams upon the upper surface of the uppermost pipe 13 of each unit. The liquid thus discharged will flow downwardly as thin sheets over the pipes 13 of each unit, the liquid passing from pipe to pipe in its descent.

A pan 29 is disposed beneath all of the units and supported by the base 2 of the cabinet for receiving and collecting the liquid which descends over the surfaces of the units. In order to avoid any possibility of leakage of the cooling or heat exchange medium into the pan 29, or the mixture of such leakage with the liquid being treated, the pan 29 is spaced horizontally to one side of the ports 17 or the headers which are connected together, so that any leakage at the ports will descend beyond one end of the pan.

In order to avoid any possibility of such leakage liquid moving horizontally along the units and mixing with the liquid being treated, a baffle or plate 30 is provided for each unit section, with apertures along its length through which the pipes 13 of the unit section pass, as shown in Fig. 5, the pipes being soldered in, or closely fitting the apertures in the plates 30, and the plates 30 of the different sections of each unit overhang one another away from the headers 14 so as to form a continuous shield or flange extending vertically along the units to keep the descending body of liquid being treated separate from any liquid that possibly may leak out at the connections to the headers. The plates 30 also serve to prevent the spreading of the liquid sheets on the pipes 13 of the units toward the headers beyond the limits of the pan 29.

In the use of a cooler of this illustrated type, the units are assembled in the manner described and suitably connected to one another through the abutting headers of corresponding sections of the abutting units. A cooling liquid or other heat exchange medium is then circulated through the interiors of the various units, and such liquid will pass back and forth through the pipes 13 of the sections and cool the pipes 13 thereof. The liquid to be treated, such as milk, is then placed in the tank 26. This liquid or milk is discharged through the bottom of the tank and descends over the surfaces of the units, being received and collected in the pan 29 from which it is removed as usual in milk plants. During its descent over the units, the milk flows in thin sheets and is, therefore, thoroughly cooled.

After a run of milk, it is necessary that the surfaces which have been exposed to milk be thoroughly cleansed, and for that purpose the tank 26 can be removed and cleansed. The closures 6 for the open sides of the cabinet which are used to prevent the entrance of dust into the cabinet while milk is being cooled, are next removed or rolled on the rails 8 into positions to uncover the sides of the cabinet.

The clamping bolts 20 are then removed, after which the units may be separated or moved away from one another and from the relatively fixed unit by shifting the units along the rails 8, thus enabling one to have access to both faces of each unit, so that the surfaces of all the pipes may be thoroughly cleansed. After the cleansing operation, the units may again be assembled ready for a new run of milk. The work and time required to separate the units is small, and a maximum cooling capacity may be obtained in a minimum of floor space occupied. All the parts are readily accessible for cleansing and the assembly and disassembly is easily and rapidly accomplished.

Heretofore it has been customary to provide ribs running lengthwise along the lower sides of the pipes, to prevent or limit spattering of the liquid passing from each pipe surface to the next lower one. When a plurality of units, each having a vertical row of pipes, are arranged side by side, with the pipes of each unit disposed in close proximity to the pipes of the next adjacent units, any spatter from the liquid descending from pipe to pipe will be largely caught by the pipes of the adjacent units. Hence, except for possibly the outermost units, the pipes of the units may be free of longitudinally extending ribs on their lower surfaces. The amount of outward spatter from the pipes of the outermost units is relatively small, and therefore all the pipes may have ribless outer surfaces if desired.

It will be obvious that various changes in the details, which have been herein described and illustrated in order to explain the nature of the invention, may be made by those skilled in the art within the principle and scope of the invention as expressed in the appended claims.

The invention is hereby claimed as follows:

1. A heat exchanger for treating liquids such as milk comprising a base, a frame rigidly fixed to said base, a cluster of relatively thin, substantially rectangular heat exchange units having heat-exchange-medium inlet and outlet ports and mounted upon said frame and arranged in close, substantially parallel, side by side relation when in operative position, said units being provided with horizontally arranged, substantially parallel heat-exchange-medium flow passages, said passages of each unit being connected to form a continuous zigzag flow passage intermediate the heat-exchange-medium inlet and outlet ports of each unit, distributing means for flowing the liquid to be treated in a thin film separately over each unit in counter-cross-current direction with respect to the direction of flow of the heat-exchange-medium when passing from the said inlet port to said outlet port of each unit and arranged above said units only when in their operative position, treated liquid collecting means arranged below said units when in their operative position, means supporting said units upon said frame for relative lateral movement away from operative position without raising or lowering the center of gravity of any of said units, thereby enabling the units to be easily separated for cleaning, means common to the several units of the cluster having elements laterally movable with the units and operable for supplying heat-exchange-medium to one end of all of the units of said cluster when in operative position and to permit said relative lateral movement for separation for cleaning, means common to the several units of the cluster having elements laterally movable with the units and operable for withdrawing heat-exchange-medium from that same end of all of the units of said cluster to which the heat-exchange-medium was supplied and operable to permit said relative lateral movement for separation for cleaning, and an openable cabinet enclosing said cluster of units and operable to permit separation of the individual units of said cluster for cleaning, whereby the space occupied by the assembled cluster when in operative position is so related to the space occupied by the units when separated for cleaning that a substantial saving in space is effected over the space which would be occupied by the same units fixedly mounted upon a frame and equally accessible for cleaning.

2. A heat exchanger for treating liquids such as milk comprising a base, a frame rigidly fixed to said base, a cluster of relatively thin, substantially flat, rectangular heat exchange units having heat-exchange-medium inlet and outlet ports and mounted upon said frame and arranged in close, substantially parallel, side by side relation when in operative position, said units being provided with horizontally arranged, substantially parallel heat-exchange-medium flow passages, said passages of each unit being connected to form a continuous zigzag flow passage intermediate the heat-exchange-medium inlet and outlet ports of each unit, distributing means for gravitationally flowing the liquid to be treated in a thin, unconfined film separately over each unit in counter-cross-current direction with respect to the direction of flow of the heat-exchange-medium when passing from the said inlet port to the said outlet port of each unit and arranged above said units only when in their operative position, treated liquid collecting means arranged below said units when in their operative position, means supporting said units upon said frame for relative lateral movement away from operative position without raising or lowering the center of gravity of any of said units, thereby enabling the units to be easily separated for cleaning, means common to the several units of the cluster having elements laterally movable with the units and operable for supplying heat-exchange-medium to one end of all of the units of said cluster when in operative position and to permit said relative lateral movement for separation for cleaning, means common to the several units of the cluster having elements laterally movable with the units and operable for withdrawing heat exchange medium from that same end of all of the units of said cluster to which the heat exchange medium was supplied and operable to permit said relative lateral movement for separation for cleaning, and an openable cabinet enclosing said cluster of units and operable to permit separation of the individual units of said cluster for cleaning, whereby the space occupied by the assembled cluster when in operative position is so related to the space occupied by the units when separated for cleaning that a substantial saving in space is effected over the space which would be occupied by the same units fixedly mounted upon a frame and equally accessible for cleaning.

3. A heat exchanger for liquids such as milk comprising a cabinet having an open side and a movable closure for said open side, a plurality of units arranged side by side in said cabinet and relatively shiftable laterally of themselves and through said open side into spaced relation to one another, said units having separable connections to one another when together by which a heat-exchange-medium may be circulated through all of said units, means for supplying to said units and removing therefrom said medium, and means for flowing the liquid to be treated over said units.

4. A heat exchanger for liquids such as milk comprising a plurality of vertical units arranged side by side and separable from one another, means for flowing a liquid downwardly over said units, each unit having superposed sections with circulation passages, corresponding sections of adjacent units having connections to one another, whereby a heat exchange medium may pass between adjacent units, and means for circulating a heat-exchange-medium through said corresponding sections separately from the other section, whereby the descending liquid may be subjected to mediums having different temperatures in different sections of each unit.

5. A heat exchanger for liquids such as milk comprising a plurality of vertical units arranged side by side and laterally separable from one another for cleaning, means for flowing a liquid downwardly over said units, each unit having superposed groups of passages connected successively in series, adjacent units also having separable connections between correspondng groups, and means for circulating a heat-exchange-medium through each group individually, whereby the descending liquid may be subjected to mediums having different temperatures in different groups of each unit.

6. A heat exchanger for liquids such as milk comprising a plurality of vertical units arranged side by side and separable from one another, a common distributor arranged above said units for discharging over them a liquid to be treated, a common collecting device beneath said units for receiving said liquid which descends over said units, separable connections between adjacent units, and means for supplying a heat-exchange-medium to one of said units and through it to the others.

7. A heat exchanger for liquids such as milk comprising a series of superposed, approximately horizontal pipes having their passages connected to one another, means removably connected to said pipes at one end of the series for circulating through the pipes a heat-exchange-medium, means for flowing a liquid to be treated downwardly over the surfaces of said pipes in succession, means on said pipes at said one end of the series for limiting the spread of the liquid along the pipes, and a pan below said pipes with one end edge thereof aligned vertically with the spread limiting means of the lowermost pipe for collecting the liquid leaving said pipes at one side of said spread limiting means, whereby any leakage from the connection to said pipes at said one end of the series will fall outside the limits of said pan and will not be mixed with said liquid.

8. A heat exchanger for liquids such as milk comprising a plurality of units arranged side by side in close relation and having passages separably connected together for the circulation of a heat-exchange-medium through said units, said units being laterally separable for cleaning, means for supplying the heat-exchange-medium to said connected units, and means for flowing the liquid over the said units.

9. A heat exchanger for liquids such as milk comprising a plurality of units arranged side by side, quickly releasable means common to the several units for detachably connecting them together in close relation for the circulation of a heat-exchange-medium through said units, said units being laterally separable for cleaning when released, and means for flowing the liquid over said units when connected.

10. A heat interchanger for milk and the like comprising a plurality of separate units arranged side by side, a frame on which one of said units is fixed and having means for supporting the other units for movement laterally away from the fixed unit and one another individually, whereby the units may be normally arranged in a compact relation side by side and shifted into spaced relation to one another and to said fixed unit for cleaning purposes, means for circulating a heat-exchange-medium through each of said units, and means for flowing a fluid to be treated downwardly over said units.

11. A heat interchanger of the cabinet type for liquids such as milk comprising a casing having an open side closed by a movable side wall, a plurality of vertically extending heat exchange units arranged face to face to one another in said casing, said units being mounted in the casing for movement laterally through the opening provided by the movable wall into spaced relation to one another, means connectable to said units when assembled in the casing for circulating a heat-exchange-medium through all of said units, means for flowing a liquid to be treated downwardly over said units when said units are in close relation to one another, and means arranged beneath the closely arranged units for receiving and collecting the liquid flowing from said units.

12. A cooler for liquids such as milk comprising a plurality of vertically extending heat exchange units arranged face to face to one another, a frame for mounting in fixed position one of the units, means provided on said frame for supporting the other units and guiding them laterally toward and from the relatively fixed unit, whereby said units may be separated widely from one another and from said fixed unit for cleaning purposes, means for circulating a heat-exchange-medium through said units, means for discharging upon the upper end of each unit a liquid to be treated, whereby the liquid will descend by gravity over the surfaces of said units, and means arranged beneath the units for receiving and collecting the liquid descending over the surfaces of said unit.

13. A cooler for liquids such as milk comprising a plurality of vertically extending heat exchange units arranged face to face to one another, a frame for mounting in fixed position one of the units, means provided on said frame for supporting the other units and guiding them laterally toward and from the relatively fixed unit, whereby said units may be separated widely from one another and from said fixed unit for cleaning purposes, means for circulating a heat exchange medium through said units, means for discharging upon the upper end of each unit a liquid to be treated, whereby the liquid will descend by gravity over the surface of said units, and means arranged beneath the units for receiving and collecting the liquid descending over the surface of said unit, each unit being divided into a plurality of vertically disposed sections, through each section of which a heat-exchange-medium may be circulated separately from the other sections of that unit.

14. In a heat exchange device for liquids such as milk, a plurality of vertically extending heat exchange units arranged face to face, a frame fixedly mounting one of said units, connections to said relatively fixed unit for circulating therethrough a heat-exchange-medium, separable connections between all adjacent units, whereby the fluid medium from said fixed unit may also circulate through the other units, means for discharging upon the upper edges thereof a liquid to be treated, whereby the liquid will descend by gravity over the surfaces of said units, and means for receiving and collecting the liquid descending over the surfaces of said units.

15. In a cooling device for liquids such as milk, a plurality of vertically extending heat exchange units arranged face to face, a frame fixedly mounting one of said units, connections to said relatively fixed unit for circulating therethrough a heat-exchange-medium, separable connections between all adjacent units, whereby the fluid medium from said fixed unit may also circulate through the other units, means arranged above said units when connected to one another for discharging upon the upper edges thereof a liquid to be cooled, whereby the liquid will descend by gravity over the surfaces of said units, and means arranged below the units for receiving and collecting the liquid descending over the surfaces of said units, each unit being divided into vertically superposed sections having separate passages for the circulation of said medium and the adjacent sections of adjacent units having separate connections to one another, whereby different heat-exchange-mediums may be circulated to different sections of the units.

16. A cooler for liquids such as milk comprising a cabinet having side walls movable to open the cabinet, a group of vertically extending heat exchange units arranged face to face in said cabinet between said movable side walls, said cabinet having means for fixedly mounting an intermediate unit of the group and also mounting the other units on each side thereof for removal through the openings provided by the movable side walls, whereby the units may be separated for the purpose of cleaning, means arranged above said group when assembled for discharging upon the upper edges thereof a liquid to be cooled, means arranged beneath said group when assembled for receiving and collecting the liquid descending over said units, and means for circulating a heat-exchange-medium through said units.

17. In a heat exchange device for liquids such as milk, a cabinet having an open side with a movable closure therefor, a plurality of vertically extending heat exchange units arranged face to face in said cabinet and across said open side, said units having passages therethrough and abutting face to face and having ports in the abutting faces, means for clamping adjacent units removably together to establish communication between the adjacent units through said ports, means for supplying a circulating heat-exchange-medium to one of said units and through that unit to the other units, means arranged for causing a liquid to be treated to flow over said units, and means for collecting the liquid flowing over said units.

18. A heat exchanger for treating liquids such as milk which comprises a plurality of vertically extending heat exchange units arranged face to face, each unit having headers at opposite ends thereof and individual tubes extending between the headers and arranged in spaced, superposed relation, said headers having ports in abutting faces in alignment with one another, whereby when the units are brought together with their headers in contact a fluid may be circulated through all of the units through the ports in the abutting faces of the headers, means for removably clamping the units together, means for supplying a heat-exchange-medium to one of said units and through that unit to the other units, means for discharging a fluid to be treated upon the upper pipe of each unit, whereby the liquid will descend by gravity over the pipes of that unit, and means arranged below the pipes and spaced horizontally away from beneath the headers having the ports for collecting the fluid descending over the surfaces of the pipes of said units.

19. A heat exchanger for liquids such as milk comprising a group of heat exchange units arranged face to face, means mounting said units for relative sidewise movement into spaced relation to one another to permit cleaning, supply pipes for conveying a heat-exchange-medium to and from said group of units, said units having connections established by the act of bringing said units together in close relation to one another by which a heat-exchange-medium may circulate through all of said units, and means for flowing over said units the liquid to be treated.

20. A heat exchanger for a liquid such as milk comprising a group of heat exchange units arranged face to face and separable from one another in a sidewise direction for cleaning, means for circulating a heat-exchange-medium through one of said units, said units having ports communicating with one another when brought together, whereby a heat-exchange-medium may be also circulated through all of said units, means for securing said units together and against separation, and means for flowing said liquid over said units while said units are assembled face to face.

21. A heat exchange device for liquids such as milk comprising a group of heat exchange units arranged face to face and vertically, each unit comprising a plurality of superimposed sections flexibly connected to one another, means for circulating a heat-exchange-medium through each of the sections of one of said units, abutting sections of adjacent units having communicating ports in abutting faces through which said medium may circulate to the other adjacent units when said units are brought together, means for preventing separation of abutting sections of said units when said units are brought together face to face, and means for flowing the liquid to be treated over the assembled units.

22. A heat exchange device for liquids such as milk comprising a group of vertically extending heat exchange units arranged face to face, means mounting said units for relative sidewise movement into spaced relation to one another to permit cleaning, each of said units being formed of superimposed sections flexibly connected to one another, whereby abutting sections of adjacent units will form a plurality of horizontal rows of said sections, means by which one heat-exchange-medium may be circulated through a section in one horizontal row and another heat-exchange-medium through a section in another horizontal row, said sections in each row having connections by which the heat-exchange-medium passing to and from one of the units in any row may also pass through all the other units of the same row, and means for flowing over said units when assembled the liquid to be treated, whereby said liquid will flow in succession over the superimposed sections of said units and be treated while so flowing by different heat-exchange-mediums.

23. A heat exchanger for liquids such as milk comprising a base, a frame rigidly fixed to said base, a plurality of relatively thin, substantially flat, rectangular heat exchange units having heat-exchange-medium inlet and outlet ports and mounted upon said frame and arranged in close, substantially parallel, side by side relation when in operative position and adapted to be relatively moved laterally of themselves toward and from each other to place said units in close, side by side, operative position and to spread the same apart for cleaning, a unitary distributing pan for gravitationally flowing the liquid to be treated in a thin, unconfined film separately over each unit when the latter is in its close, operative position, treated liquid collecting means arranged below said units when in their operative position, means supporting said units upon said frame for relative lateral movement away from operative position without raising or lowering the center of gravity of any of said units, said units being movable toward and away from each other relative to their normal operative position in which they are aligned in close, side by side position below said distributing pan, and means for supplying a heat-exchange-medium to the several units and operable to permit the spreading apart of the units.

24. A heat exchange device for liquids such as milk comprising a group of heat exchange units arranged face to face and laterally separable for cleaning, each unit comprising a plurality of superimposed sections flexibly connected to one another, each section having at an end thereof a connection by which a heat-exchange-medium may circulate through said section, each section having a baffle adjacent said end thereof to prevent fluid travel thereby along the section in an endwise direction, the baffles on the sections of each unit cooperating with one another to form a vertical, approximately continuous wall and the baffles of adjacent units extending into close proximity to one another to form a shield wall, means for flowing a liquid to be treated over said units, and a pan arranged beneath said units for collecting the liquid passing over the same and having an edge aligned vertically with the lower ends of said baffles, whereby any leakage of the heat-exchange-medium at said connections will be deflected away from said pan and from the surfaces of said units over which said liquid is flowing.

25. A heat exchange device for liquids such as milk comprising a group of heat exchange units arranged face to face and movable in a sidewise direction into spaced relation to one another for cleaning, adjacent units having communicating ports by which a heat exchange medium in one of said units may pass to the others, means for attaching all of said units together face to face with said ports connecting them, means for flowing a liquid to be treated over said units, and means for circulating a heat-exchange-medium through one of said units and through it to the other units.

26. A heat exchange device for liquids such as milk comprising a group of heat exchange units arranged face to face and movable in a sidewise direction into spaced relation to one another for cleaning, adjacent units having aligned communicating ports by which a heat-exchange-medium in one of said units may pass to the others, means for attaching all of said units together face to face with said ports connecting them, means for flowing a liquid to be treated over said units, and means for circulating a heat-exchange-medium through one of said units and through it to the other units, said attaching means including a member extending through all of said aligned ports including the outside units of the group and terminating at its ends in elements engaging the outer ports of the outside units and closing those ports and drawing the units towards one another.

27. A heat exchanger for treating liquids such as milk comprising a base, a frame rigidly fixed to said base, a cluster of relatively thin, substantially rectangular heat exchange units having heat-exchange-medium inlet and outlet ports and mounted upon said frame and arranged in close, substantially parallel, side by side relation when in operative position, said units being provided with horizontally arranged, substantially parallel heat-exchange-medium flow passages, said passages being connected at alternate ends to form a zigzag flow passage intermediate the heat-exchange-medium inlet and outlet of each unit, distributing means for flowing the liquid to be treated in a thin film separately over each unit in counter-cross-current direction with respect to the direction of flow of the heat-exchange-medium when passing from the said inlet port to the said outlet port of each unit and arranged above said units only when in their operative position, treated liquid collecting means arranged below said units when in their operative position, means supporting said units upon said frame for relative lateral movement away from operative position without raising or lowering the center of gravity of any of said units, thereby enabling the units to be easily separated for cleaning, means common to the several units of the cluster having elements laterally movable with the units and operable for supplying heat-exchange-medium to one end of all of the units of said cluster when in operative position and to permit said relative lateral movement for separation for cleaning, means common to the several units of the cluster having elements laterally movable with the units and operable for withdrawing heat-exchange-medium from that same end of all of the units of said cluster to which the heat-exchange-medium was supplied and operable to permit said relative lateral movement for separation for cleaning, and an openable cabinet enclosing said cluster of units and operable to permit separation of the individual units of said cluster for cleaning, said heat exchange units being so shaped, proportioned, constructed and arranged that the space occupied by the assembled cluster when in operative position is so related to the space occupied by the cluster when the units are separated for cleaning that a substantial saving in space is effected over the space which would be occupied by the same units when fixedly mounted upon a frame and equally accessible for cleaning.

28. A heat exchanger comprising a group of heat exchange units arranged face to face, abutting faces of adjacent units having aligned ports, a sleeve fitted into each pair of aligned abutting ports to provide a passage between adjacent units, means for forcing said units together, means for flowing a heat exchange liquid over said units, and means for circulating a heat exchange fluid through said units.

29. A heat exchanger comprising a group of heat exchange units arranged face to face, abutting faces of adjacent units having aligned ports, a sleeve fitted into each pair of aligned abutting ports to provide a passage between adjacent units, a gasket ring surrounding each sleeve and compressed between abutting faces of said units when the units are together, means for forcing said units together, means for flowing a heat exchange liquid over said units, and means for circulating a heat exchange fluid through said units.

30. A heat exchanger comprising a group of heat exchange units arranged face to face, said units having passages therethrough for the circulation of a heat-exchange-medium, abutting faces of adjacent units having aligned ports with telescopic portions to provide passages between abutting units, a gasket ring surrounding the ports between each pair of abutting units, caps closing the outer ports of the outermost units, means connecting said caps and passing through said units and aligned ports thereof for drawing said caps toward one another to clamp all of said units together and form liquid tight connections between them, means for flowing a heat exchange liquid over said units, and means for circulating a heat exchange fluid through all of said assembled units.

31. A heat exchanger for liquids such as milk comprising a plurality of heat exchange units mounted for relative movement laterally of themselves toward and from each other to place said units in close, side by side, operative relation and to spread the same apart for cleaning, a distributor arranged above said units for flowing a liquid over the several units when the latter are in their close relation, said units being movable toward and from each other relatively to said distributor and when in their close relation being operatively aligned with said distributor, and means for supplying a heat-exchange-medium to the several units and operable to permit the spreading apart of the units.

CHERRY-BURRELL CORPORATION,
*Assignee of Harvey Feldmeier, Deceased,*
By W. L. CHERRY,
*President.*